RECEIVERS FOR USE IN ELECTRIC SIGNALLING SYSTEMS
Filed May 27, 1957
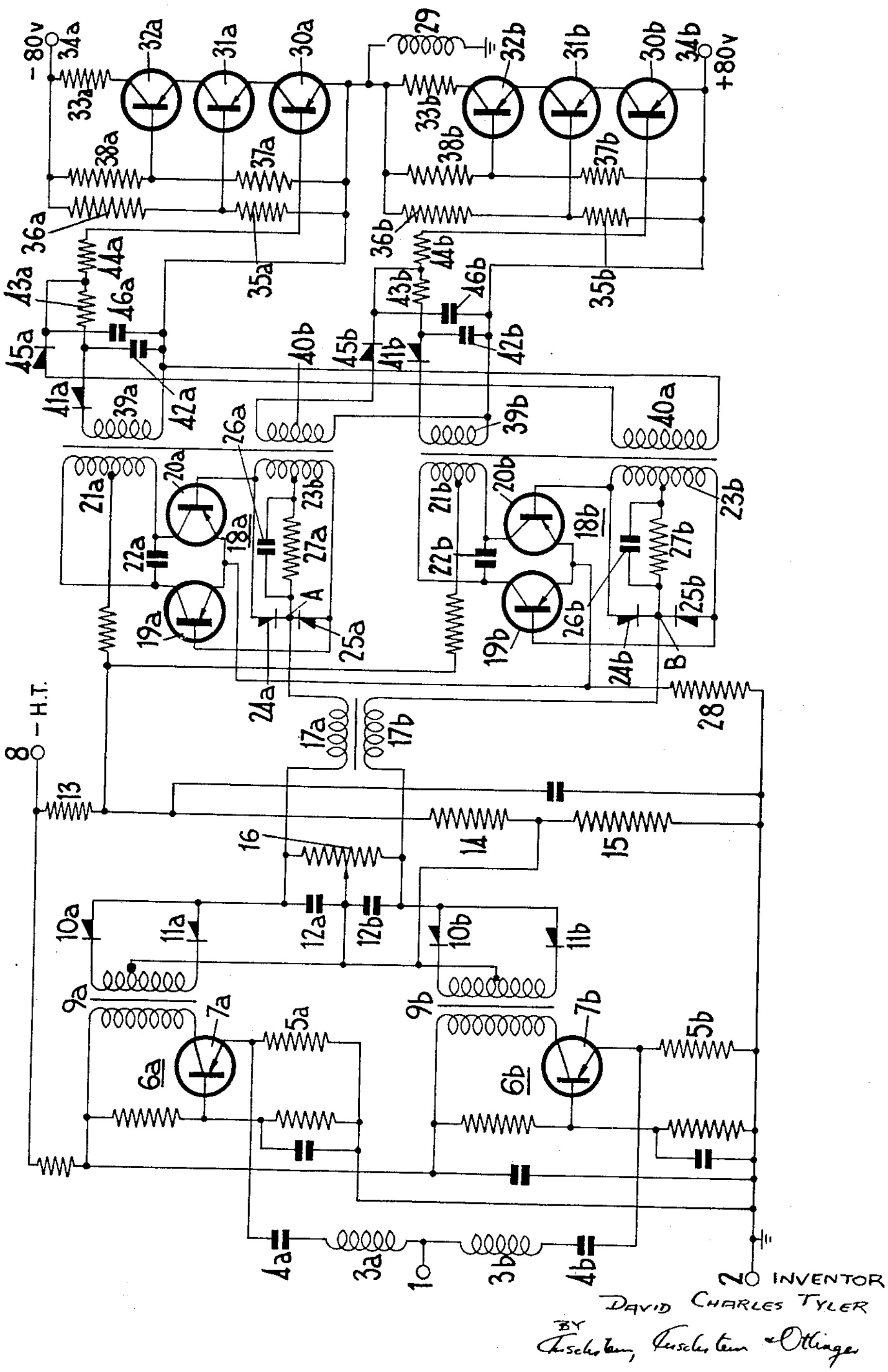
INVENTOR
David Charles Tyler
BY
Fischer, Fischer & Ottinger
ATTORNEYS United States Patent Office 2,999,170

Patented Sept. 5, 1961

2,999,170

RECEIVERS FOR USE IN ELECTRIC SIGNALLING SYSTEMS

David Charles Tyler, near Rugby, England, assignor to The General Electric Company Limited, London, England Filed May 27, 1957, Ser. No. 661,629
Claims priority, application Great Britain May 29, 1956
5 Claims. (Cl. 307—88.5)

This invention relates to receivers for use in electric signalling systems.

The invention is concerned in particular with receivers for use in electric signalling systems of the kind in which there are transmitted electrical signals in which information is conveyed by the occurrence of one or other of a small plurality of discrete states of an electrical variable between which relatively rapid transitions occur; examples of such systems are electric telegraph systems and telecommunication systems in which dialling impulses are transmitted. The electrical variable may for example be the magnitude of a direct current or the amplitude or frequency of a carrier wave.

In receivers for use in electric signalling systems of the kind specified it is common practice to control the operation of a receiving instrument, such as the receiving device of a teleprinter, by means of an output relay which is operated in response to the received signals. By this means it is possible to operate the receiving instrument from a local power supply, with consequent advantages over the case where the receiving instrument is directly operated by the received signals. Hitherto it has been usual to utilise a high speed mechanical relay for this purpose, but it is found that such a relay requires considerable maintenance, which is expensive and may be embarrassing in situations where adequate maintenance facilities are not available. It has therefore recently been proposed that a junction transistor switching arrangement should be utilised to perform the function of such an output relay, since such a switching arrangement would require little maintenance.

As is known, a junction transistor can be used as a satisfactory switching element by connecting the collector electrode and either the emitter electrode or the base electrode in a circuit in which switching is required, and applying between the emitter and base electrodes a trigger voltage of such a form that the transistor is alternately in a high impedance condition and a low impedance condition. It is preferable that in the high impedance condition the transistor should be cut off, that is to say in a condition in which substantially no emitter current, and therefore only a very small collector current, flows in the transistor, and that in the low impedance condition the transistor should be bottomed, that is in a condition in which the input current is so large that any further increase of this current does not result in a significant change in the collector current; where this is so the power dissipated in the transistor in either the low impedance condition or the high impedance condition is very small, so that, provided that a short time is taken for the transistor to change from one condition to the other, the transistor may be used for switching powers greatly in excess of those which it is capable of handling when used as a conventional amplifier.

Where a junction transistor switching arrangement is utilised in the manner mentioned above, it would be possible to operate the switching arrangement by means of voltages derived directly from the received signals. The inventor has found, however, that this is in general undesirable, since the received signals will normally be distorted in such a way that the transitions in them are appreciably less rapid than those in the signals as transmitted, so that if voltages derived directly from the received signals are used to operate the switching arrangement there is a risk that the mean power dissipated in the transistors in the switching arrangement will be excessive.

The present invention provides a more satisfactory alternative, and consists in a receiver for use in an electric signalling system of the kind specified in which the operation of a receiving instrument is arranged to be controlled by means of a junction transistor switching arrangement which is arranged to be operated in response to the received signals, the receiver including a generator adapted to produce at least one output voltage of substantially rectangular waveform in response to application of the received signals, the transitions in the output voltage(s) corresponding to, but being appreciably more rapid than, transitions between the discrete states of the electrical variable in the received signals, and means for applying the output voltage(s) to operate the switching arrangement.

Preferably the generator is arranged so that if the receiver is operative in the absence of received signals the generator produces at least one output voltage of constant magnitude, such output voltage(s) being applied to the switching arrangement in such a manner that each transistor in the switching arrangement is either in a high impedance condition or in a low impedance condition; this ensures that if the receiver is operative in the absence of received signals relatively little power will be dissipated in the transistors in the switching arrangement.

The generator may conveniently include at least one oscillator arranged to be alternately oscillating and non-oscillating in response to application of the received signals, and means to produce the output voltage(s) of substantially rectangular waveform by rectification of the output of the oscillator(s); in this case, the arrangement is preferably such that if the receiver is operative in the absence of received signals at least one oscillator oscillates continuously, the output voltage(s) of constant magnitude being provided by rectification of the output of such oscillator(s).

One arrangement in accordance with the present invention will now be described by way of example with reference to the accompanying drawing which is a circuit diagram of part of a receiver for one channel of a multichannel frequency shift voice frequency electric telegraph system.

In this system the signals for each channel are in the form of a continuous audio frequency tone whose frequency is periodically rapidly changed between two discrete values which differ from each other by 60 cycles per second, and which correspond respectively to "mark" and "space." Different pairs of frequencies are used for the different signals in the respective channels, the signals for the various channels being separated from each other at the receiving station by means of bandpass filters and being individually applied to receivers of the form about to be described. In the signals as generated at the transmitter the transitions between the two frequencies occupy about one millisecond each; during transmission, and particularly in the passage of the signals through the bandpass filters used in the system, the transitions become degraded so that they occupy about 18 milliseconds each.

Referring now to the drawing, it will be noted that in certain stages of the receiver some elements are duplicated, and for convenience in such cases corresponding reference numerals, with respective suffixes "*a*" and "*b*," will be used for corresponding elements. The received signals for the relevant channel, after passing through conventional amplifying and amplitude limiting stages (not shown), are applied between input terminals 1 and 2, the latter of which is earthed. Connected in parallel between the terminals 1 and 2 are a pair of series resonant circuits each consisting of an inductor 3*a* or 3*b*, a capacitor 4*a* or 4*b* and a resistor 5*a* or 5*b*; these two resonant circuits are respectively tuned to the two frequencies representing "mark" and "space" for the received signals. The voltages appearing across the resistors 5*a* and 5*b* are respectively amplified by amplifiers 6*a* and 6*b*, which respectively include P-N-P germanium junction transistors 7*a* and 7*b* connected in the common base configuration; the amplifiers 6*a* and 6*b* are energised from a constant voltage source having a negative terminal 8 and a positive terminal (not shown) which is earthed. An output voltage is derived from the amplifier 6*a* via a transformer 9*a*, and is rectified in a full wave rectifier circuit incorporating rectifiers 10*a* and 11*a*, the rectified voltage appearing across a capacitor 12*a*; the output of the amplifier 6*b* is utilised in similar manner to produce a voltage across a capacitor 12*b* which has one of its electrodes connected to one of the electrodes of the capacitor 12*a*. The junction between the capacitors 12*a* and 12*b* is maintained at a constant negative potential with respect to earth by connecting it to a suitable point on a potentiometer consisting of resistors 13, 14 and 15 connected in series across the constant voltage source, this negative potential having a magnitude greater than the amplitudes (which are substantially equal) of the voltages respectively developed across the capacitors 12*a* and 12*b*. A potentiometer 16 is connected across the capacitors 12*a* and 12*b* and has a variable tapping which is connected to the junction between the capacitors 12*a* and 12*b* and is adjustable to compensate for any unbalance in the received signals.

It will be appreciated that there appear at opposite ends of the potentiometer 16 voltages which are negative with respect to earth and which are of quasi-rectangular waveform, the transitions in these voltages corresponding to the transitions in the received signals and being of opposite senses for the opposite ends of the potentiometer 16. The voltages appearing at the ends of the potentiometer 16 are respectively applied via the windings 17*a* and 17*b* of a transformer to points A and B in a pair of oscillator circuits 18*a* and 18*b* which are energised from the constant voltage source referred to above.

The oscillator circuit 18*a* includes a pair of P-N-P germanium junction transistors 19*a* and 20*a* connected in push-pull, feedback being provided by means of a transformer, having a primary winding 21*a* which is connected between the collector electrodes of the transistors 19*a* and 20*a* and is tuned by means of a capacitor 22*a*, and having a secondary winding 23*a* connected between the base electrodes of the transistors 19*a* and 20*a*. The oscillator circuit 18*a* also includes a self-biassing arrangement constituted by a full wave rectifier circuit connected so as to rectify the voltage appearing across the secondary winding 23*a* and incorporating a pair of rectifiers 24*a* and 25*a*, a capacitor 26*a* and a resistor 27*a*; when the oscillator circuit 18*a* is operating, this self-biassing arrangement produces a substantially constant voltage across the resistor 27*a*, which is arranged to have a magnitude somewhat less than the amplitude of the transitions in the voltage applied to the point A. It will be seen that the base electrodes of the transistors 19*a* and 20*a* are biassed negatively with respect to earth by an amount equal to the sum of the voltage appearing at the point A and the voltage appearing across the resistor 27*a*. The oscillator circuit 18*b* is exactly similar to the oscillator circuit 18*a*, and will therefore not be described in detail. The emitter electrodes of all the transistors 19*a*, 19*b*, 20*a* and 20*b* are connected together to one end of a resistor 28 whose other end is earthed.

The operation of the oscillator circuits 18*a* and 18*b* is as follows. It will be assumed initially that the received signals have the frequency corresponding to "mark" and that in this condition the point A is more negative with respect to earth than the point B. For the sake of definiteness, it will be further assumed that in this condition of the receiver the potential of the point A is 5.5 volts negative with respect to earth and the potential of the point B is 5 volts negative with respect to earth. In this condition of the receiver, the oscillator circuit 18*a* will be operating, and a small additional bias voltage (say of 0.3 volt) will be developed across the resistor 27*a*, so that the mean potential of the base electrodes of the transistors 19*a* and 20*a* will be about 5.8 volts negative with respect to earth. Due to the flow of the emitter currents of the transistors 19*a* and 20*a* through the resistor 28, the emitter electrodes of the transistors 19*a* and 20*a* will be at a mean potential which is slightly less negative than that of the base electrodes of the transistors 19*a* and 20*a* (say 5.7 volts negative with respect to earth). The emitter electrodes of the transistors 19*b* and 20*b* will be at the same potential as the emitter electrodes of the transistors 19*a* and 20*a*, and will therefore be negative with respect to the base electrodes of the transistors 19*b* and 20*b*; consequently the transistors 19*b* and 20*b* will be cut off and the oscillator circuit 18*b* will be inoperative.

When the next transition occurs in the received signals, the potential of the point A will change relatively slowly towards a value of 5 volts negative with respect to earth, and the potential of the point B will change relatively slowly towards a value of 5.5 volts negative with respect to earth. During the initial part of the transition, the oscillator circuit 18*a* will continue to operate at a substantially constant level and the oscillator circuit 18*b* will remain inoperative, the mean potential of the base electrodes of the transistors 19*a* and 20*a*, and consequently the mean potential of the emitter electrodes of these transistors, becoming less negative with respect to earth at substantially the same rate as the potential of the point A. At some instant during the transition, after the potential at the point B has become more negative than that at the point A, the potential at the point B will become sufficiently more negative than the mean potential of the emitter electrodes of the transistors 19*b* and 20*b* for the oscillator circuit 18*b* to commence operating. Oscillations will build up rapidly in this circuit, particularly in view of the extra bias voltage which will then appear across the resistor 27*b*. At the same time the mean potential of the base electrodes of the transistors 19*b* and 20*b* will become rapidly more negative, and so, in consequence, will the mean potential of the emitter electrodes of the transistors 19*b* and 20*b*; the emitter electrodes of the transistors 19*a* and 20*a* will therefore rapidly be driven negative with respect to the base electrodes of these transistors, thus cutting off the transistors 19*a* and 20*a* and causing the oscillator circuit 18*a* to become inoperative. This effect is enhanced by the fact that the voltage appearing across the resistor 27*a* will drop to zero as the oscillator circuit 18*a* becomes inoperative. After the oscillator circuit 18*a* has become inoperative, the mean potential of the base electrodes of the transistors 19*b* and 20*b* will continue to go more negative until the end of the transition in the received signals, but the output of the oscillator circuit 18*b* will be maintained at a substantially constant level since the mean potential of the emitter electrodes of the transistors 19*b* and 20*b* will go more negative at substantially the same rate.

The transition between the states in which the oscillator circuits 18*a* and 18*b* are respectively operating can thus be made very rapid, and it has been found possible in practice to achieve readily transition times as low as 300 microseconds. The use of windings 17*a* and 17*b* of a transformer for feeding voltages from the potentiometer 16 to the points A and B assists in achieving a rapid transition, and ensures that there is no tendency for the oscillator circuits 18a and 18b to jump back to their original state once a transition has started. It will be appreciated that once the oscillator circuit 18b is operating and the oscillator circuit 18a is inoperative the receiver will continue in this condition until the next transition occurs in the received signals, when the receiver will revert in a similar manner to that described above to the condition in which the oscillator circuit 18a is operating and the oscillator circuit 18b is inoperative.

Furthermore, it should be noted that if the receiver is operative in the absence of received signals the potentials of the points A and B will be equal; in this condition of the receiver only one of the oscillator circuits 18a and 18b will operate. Thus, if this condition arises due to the cessation of received signals while the receiver is operating, the oscillator circuit which was last operative during the reception of signals will continue to operate, and the other to remain inoperative; alternatively, if the receiver is switched on in the absence of received signals one of the oscillator circuits 18a and 18b will invariably start to operate before the other, causing an extra bias voltage to appear on the base electrodes of the transistors of the oscillator circuit which starts to operate first, thereby causing the emitter electrodes of all the transistors in the oscillator circuits 18a and 18b to be driven more negative, and thus ensuring that the transistors in the other oscillator circuit are held cut off.

The outputs of the oscillator circuits 18a and 18b are utilised, in a manner to be described in more detail below, to provide voltages for operating a junction transistor switching ararngement which is arranged to control the operation of the receiving device of a teleprinter. The switching arrangement operates so as to apply either a positive or a negative potential to one end of a load 29 whose other end is earthed; the load 29 is shown in the drawing as constituted by the operating coil of the receiving device of the teleprinter, but may also include other conventional circuit elements, which, for the sake of simplicity, are not shown. The switching arrangement comprises two switching circuits each of which incorporates three P-N-P germanium junction transistors. For one switching circuit, the emitter electrode of a first transistor 30a is connected to the unearthed end of the load 29, the collector electrode of the transistor 30a is connected to the emitter electrode of a second transistor 31a, the collector electrode of the transistor 31a is connected to the emitter electrode of a third transistor 32a, and the collector electrode of the transistor 32a is connected via a resistor 33a to a terminal 34a which is maintained in operation at a potential of 80 volts negative with respect to earth. The base electrode of the transistor 31a is connected to the junction between a pair of high valued resistors 35a and 36a which are connected in series between the emitter electrode of the transistor 30a and the end of the resistor 33a remote from the collector electrode of the transistor 32a, the value of the resistor 35a being half that of the resistor 36a. The base electrode of the transistor 32a is connected to the junction between a second pair of high valued resistors 37a and 38a connected in series between the same points as the resistors 35a and 36a, the value of the resistor 37a being twice that of the resistor 38a. The second switching circuit incorporates transistors 30b, 31b, and 32b, and resistors 33b, 35b, 36b, 37b and 38b, which are identical with the corresponding elements of the first switching circuit and are connected together in a similar manner, but in this case the emitter electrode of the first transistor 30b is connected to a terminal 34b which is maintained in operation at a potential of 80 volts positive with respect to earth, while the end of the resistor 33b remote from the collector electrode of the transistor 32b is connected to the unearthed end of the load 29.

Returning now to the oscillator circuits 18a and 18b, the feedback transformer of the oscillator circuit 18a has two further windings 39a and 40b across which output voltages are developed when the oscillator circuit 18a is operating, and the feedback transformer of the oscillator circuit 18b similarly has two further windings 39b and 40a across which output voltages are developed when the oscillator circuit 18b is operating. The output voltage appearing across the winding 39a is rectified by a rectifier 41a, the rectified voltage appearing across a capacitor 42a, one electrode of which is connected to the emitter electrode of the transistor 30a; the voltage appearing at the other electrode of the capacitor 42a is applied via resistors 43a and 44a to the base electrode of the transistor 30a, this voltage being such that the base electrode of the transistor 30a is biassed negatively with respect to its emitter electrode to an extent sufficient to bring the transistor 30a into the bottomed condition. The output voltage appearing across the winding 40a is rectified by a rectifier 45a, the rectified voltage appearing across a capacitor 46a, one electrode of which is connected to the emitter electrode of the transistor 30a; the voltage appearing at the other electrode of the capacitor 46a is applied via the resistor 44a to the base electrode of the transistor 30a, this voltage being such that the base electrode of the transistor 30a is biassed positive with respect to its emitter electrode so that the transistor 30a is cut off. The resistors 43a and 44a are provided in order to ensure that the very low input impedance of the transistor 30a when it is bottomed is not shunted directly across the capacitor 42a, so as to prevent the possibility of too heavy a flow of current in the input circuit of the transistor 30a and also to eliminate substantially any risk of a ripple voltage being developed across the load 29. It will be appreciated that when a voltage appears across the capacitor 42a a current will flow in the forward direction through the rectifier 45a, and it is desirable that the impedance of the rectifier 45a in this condition should be appreciably higher than the input impedance of the transistor 30a in the bottomed condition.

It will thus be seen that the output voltages alternately appearing across the windings 39a and 40a are utilised to provide a voltage of substantially rectangular waveform which is applied so as to bias the base electrode of the transistor 30a alternately negative and positive with respect to its emitter electrode, so that the transistor 30a is alternately bottomed and cut off; the negative and positive biasses on the base electrode of the transistor 30a correspond respectively to the operation of the oscillator circuits 18a and 18b. The output voltages alternately appearing across the windings 39b and 40b are similarly utilised to provide a voltage of substantially rectangular waveform which is applied so as to bias the base electrode of the transistor 30b alternately positive and negative with respect to its emitter electrode, so that the transistor 30b is alternately cut off and bottomed; the positive and negative biasses on the base electrode of the transistor 30b correspond respectively to the operation of the oscillator circuits 18a and 18b. Thus when the transistor 30a is bottomed the transistor 30b is cut off and vice versa. It will be appreciated that the transitions between the states of the transistors 30a and 30b are practically as rapid as the transitions between the states of the oscillator circuits 18a and 18b, provided that the time constants of the rectifier circuits utilised to provide the voltages applied to the transistors 30a and 30b are sufficiently short.

Consider now the condition of the switching arrangement in which the transistor 30a is bottomed and the transistor 30b is cut off. The transistor 30a will have a very low impedance between its collector and emitter electrodes, and since this low impedance is connected in the emitter circuit of the transistor 31a a substantial base current will flow in the transistor 31a, bringing the transistor 31a also into a low impedance condition; the transistor 32a will also be brought into a low impedance condition for similar reasons. The relative values of the resistors 33a, 35a, 36a, 37a and 38a, are chosen so that the base currents flowing in the transistors 31*a* and 32*a* are sufficiently large to bias these transistors into the bottomed condition. Thus with all the transistors 30*a*, 31*a* and 32*a* bottomed only a very small voltage will be developed between the emitter electrode of the transistor 30*a* and the collector electrode of the transistor 32*a*, and the unearthed end of the load 29 will consequently be held at a negative potential whose precise value depends upon the relative impedances of the load 29 and the resistor 33*a*. It will be appreciated that some loss of voltage occurs across the resistor 33*a*, but its provision is necessary in order to ensure that the transistors 31*a* and 32*a* are fully bottomed when the transistor 30*a* is bottomed; this is because each of the transistors 31*a* and 32*a* must have its base electrode at substantially the same potential as its collector electrode in the bottomed condition, and since the flow of sufficient base current in the relevant transistor implies an appreciable potential difference between that base electrode and the terminal 34*a* provision must be made for a similar potential difference to appear between the collector electrode of the transistor and the terminal 34*a*.

As will be recalled, when the transistor 30*a* is bottomed, the transistor 30*b* is cut off. Thus the transistor 30*b* will have a high impedance between its emitter and collector electrodes and since this high impedance is connected in the emitter circuit of the transistor 31*b* very little emitter current can flow in the transistor 31*b* and this transistor will therefore be substantially cut off; the transistor 32*b* will also be substantially cut off for similar reasons. It is of course desirable that the values of the resistors 35*b*, 36*b*, 37*b* and 38*b*, should be sufficiently high to avoid any appreciable reduction of the impedance between the terminal 34*b* and the unearthed end of the load 29 when the transistors 30*b*, 31*b* and 32*b* are cut off. With these transistors cut off, the collector electrode of the transistor 32*b* will herefore be at substantially the same potential as the unearthed end of the load 29, and consequently a large fraction of the total voltage of 160 volts between the terminals 34*a* and 34*b* will appear between the collector electrode of the transistor 32*b* and the emitter electrode of the transistor 30*b*. The total voltage appearing between these two electrodes is shared substantially equally between all three transistors 30*b*, 31*b* and 32*b* by virtue of the fact that the base electrodes of the transistors 31*b* and 32*b* are maintained at potentials with respect to the emitter electrode of the transistor 30*b* which are respectively approximately one third and two thirds of the potential of the collector electrode of the transistor 32*b* with respect to the emitter electrode of the transistor 30*b*, and the fact that, since practically no emitter current flows in the transistors 31*b* and 32*b*, the emitter electrodes of the transistors 31*b* and 32*b*, and consequently the collector electrodes of the transistors 30*b* and 31*b*, will be maintained respectively at substantially the same potentials as the base electrodes of the transistors 31*b* and 32*b*.

It will be appreciated that a similar analysis to that given above may be made of the condition of the switching arrangement in which the transistor 30*a* is cut off and the transistor 30*b* is bottomed. The analysis will not be given in detail here, it being sufficient to note that in this condition the unearthed end of the load 29 will be held at a positive potential, and that a large fraction of the total voltage of 160 volts between the terminals 34*a* and 34*b* will appear between the collector electrode of the transistor 32*a* and the emitter electrode of the transistor 30*a*.

It will be recalled that if the receiver is operative in the absence of received signals, one of the oscillator circuits 18*a* and 18*b* will operate and the other will be inoperative. In this condition of the receiver, it will be seen that voltages of constant magnitude will be applied between the base and emitter electrodes of the transistors 30*a* and 30*b*, these voltages being such that either all the transistors 30*a*, 31*a* and 32*a* are bottomed and all the transistors 30*b*, 31*b* and 32*b* are substantially cut off or vice versa. Thus in this condition of the receiver little power will be dissipated in the transistors in the switching arrangement. A further advantage of the arrangement of the oscillator circuits 18*a* and 18*b* is that the operation of the switching arrangement is relatively unaffected by frequency drift or amplitude variation in the received signals.

I claim:

1. A receiver for use in an electric signalling system of the kind in which there are transmitted electrical signals in which information is conveyed by the occurrence of one or other of a small plurality of discrete states of an electrical variable between which relatively rapid transitions occur as generated but which transitions become degraded during transmission, said receiver including a receiving instrument, a switching arrangement comprising at least one junction transistor for controlling the operation of the receiving instrument, means for producing in response to application of the received signals, an output comprising at least one voltage of substantially rectangular waveform in which each transition corresponds to, but is appreciably more rapid than, a degraded transition between discrete states of the electrical variable in the received signals, means for applying the received signals to said means for producing the output, and means for applying the output to operate the switching arrangement.

2. A receiver according to claim 1 including means operative in the absence of received signals to produce an output comprising at least one voltage of constant magnitude, and means for applying such output to the switching arrangement so that every transistor in the switching arrangement is either in a high impedance condition or in a low impedance condition.

3. A receiver according to claim 1 in which the means for producing the output includes a plurality of oscillators, means for rendering each oscillator alternately oscillating and non-oscillating in response to application of the received signals, and means to produce the output comprising at least one voltage of substantially rectangular waveform by rectification of the output of the oscillators.

4. A receiver according to claim 3 including means for ensuring that in the absence of received signals one oscillator oscillates continuously, means to produce an output comprising at least one voltage of constant magnitude by rectification of the output of such oscillator, and means for applying such output to the switching arrangement so that every transistor in the switching arrangement is either in a high impedance condition or in a low impedance condition.

5. A receiver according to claim 3 in which the number of discrete states of the electrical variable is two, and the means for producing the output includes two oscillators, means for rendering one oscillator oscillating and the other non-oscillating when the electrical variable is in one of the discrete states and vice versa when the electrical variable is in the other of the discrete states, and means for combining unidirectional voltages of opposite polarities which are respectively derived by rectification from the two oscillators to produce two voltages of substantially rectangular waveform which constitute said output.

References Cited in the file of this patent

UNITED STATES PATENTS

| | | |
|---|---|---|
| 2,112,877 | Beverage | Apr. 5, 1938 |
| 2,150,241 | Nichols et al. | Mar. 14, 1939 |
| 2,186,544 | Koch | Jan. 9, 1940 |
| 2,292,387 | Markey et al. | Aug. 11, 1942 |
| 2,491,387 | Miller | Dec. 13, 1949 |

(Other references on following page)

UNITED STATES PATENTS

| | | |
|---|---|---|
| 2,644,036 | Jones | June 30, 1953 |
| 2,783,384 | Bright et al. | Feb. 26, 1957 |
| 2,797,261 | Polyzou | June 25, 1957 |
| 2,884,518 | O'Neill | Apr. 28, 1959 |
| 2,903,605 | Barney et al. | Sept. 8, 1959 |

FOREIGN PATENTS

| | | |
|---|---|---|
| 921,999 | Germany | Jan. 7, 1955 |

OTHER REFERENCES

Article entitled "An N-Stage Series Transistor Circuit," by Beck, IRE Transactions, Circuit Theory, vol. CT-3, No. 1, March 1956, pages 44–51.